United States Patent
Buckner

(10) Patent No.: US 9,056,266 B2
(45) Date of Patent: Jun. 16, 2015

(54) METHOD AND SYSTEM TO SEPARATE SOLIDS FROM LIQUIDS

(76) Inventor: Don M. Buckner, Okahumpka, FL (US)

(*) Notice: Subject to any disclaimer, the term of this patent is extended or adjusted under 35 U.S.C. 154(b) by 319 days.

(21) Appl. No.: 13/555,104

(22) Filed: Jul. 21, 2012

(65) Prior Publication Data

US 2014/0021148 A1    Jan. 23, 2014

(51) Int. Cl.
*B01D 21/02* (2006.01)
*B01D 21/00* (2006.01)

(52) U.S. Cl.
CPC .... *B01D 21/0048* (2013.01); *B01D 2021/0078* (2013.01); *B01D 21/0066* (2013.01)

(58) Field of Classification Search
CPC ............. B01D 21/02; B01D 21/0024; B01D 21/0039; B01D 21/0048; B01D 21/0066; B01D 2021/0078
USPC ........................ 210/800, 801, 521, 522, 532.1
See application file for complete search history.

(56) References Cited

U.S. PATENT DOCUMENTS

| | | | |
|---|---|---|---|
| 349,990 A * | 9/1886 | Gaillet | 210/521 |
| 554,815 A * | 2/1896 | Field | 210/521 |
| 801,679 A * | 10/1905 | Niclausse | 210/522 |
| 1,312,027 A * | 8/1919 | Falley | 210/522 |
| 2,181,684 A * | 11/1939 | Walker | 210/521 |
| 2,230,386 A * | 2/1941 | Pecker | 210/521 |
| 2,639,601 A | 5/1953 | Miller | |
| 3,703,467 A * | 11/1972 | Lummus | 210/522 |
| 4,119,238 A | 10/1978 | Ja'afar | |
| 4,334,633 A | 6/1982 | Piegza | |
| 4,396,508 A * | 8/1983 | Broughton | 210/522 |
| 4,744,698 A | 5/1988 | Dallimer | |
| 4,760,656 A | 8/1988 | East | |
| 5,004,534 A * | 4/1991 | Buzzelli | 210/532.1 |
| 5,092,963 A | 3/1992 | Barker | |
| 5,191,993 A | 3/1993 | Wanger | |
| 5,500,976 A | 3/1996 | Rohrbacher | |
| 5,515,625 A | 5/1996 | Keigley | |
| 5,887,667 A | 3/1999 | Van Zante | |
| D423,521 S | 4/2000 | Walter | |
| 6,360,458 B2 | 3/2002 | Dolister | |
| 6,397,967 B1 | 6/2002 | McIlwraith | |
| 6,499,934 B1 | 12/2002 | Kaczmarski | |
| 6,550,406 B2 | 4/2003 | Bass | |
| 6,604,304 B1 | 8/2003 | Slabach | |
| 6,988,568 B2 | 1/2006 | Buckner | |
| 7,484,322 B2 | 2/2009 | Maybury, Jr. | |
| 7,837,050 B2 | 11/2010 | Maybury, Jr. | |
| 8,066,140 B1 | 11/2011 | Young | |
| 8,336,231 B2 | 12/2012 | Marbury | |
| 2009/0095690 A1* | 4/2009 | McCabe | 210/251 |

* cited by examiner

*Primary Examiner* — Christopher Upton
(74) *Attorney, Agent, or Firm* — Matthew G. McKinney, Esq.; Allen, Dyer, Doppelt, Milbrath & Gilchrist, P.A.

(57) ABSTRACT

A system to separate solids from liquids is disclosed. In a particular embodiment, the system includes a series of alternating baffles disposed along a length of a tank, where the series of alternating baffles define a vertical tortuous flow path of the fluid from a first end of the tank to a second end of the tank to cause solids to settle out of the fluid. The alternating baffles each have a sloped planar surface disposed between a lower horizontal planar surface and an upper horizontal planar surface to cause at least one eddy in a vertical plane as the fluid flows through the tank. The system may also include a series of tanks in fluid communication with the at least one tank and secured side by side, where the solids progressively settle out from the fluid in stages as the fluid passes from one tank to another in series.

6 Claims, 3 Drawing Sheets

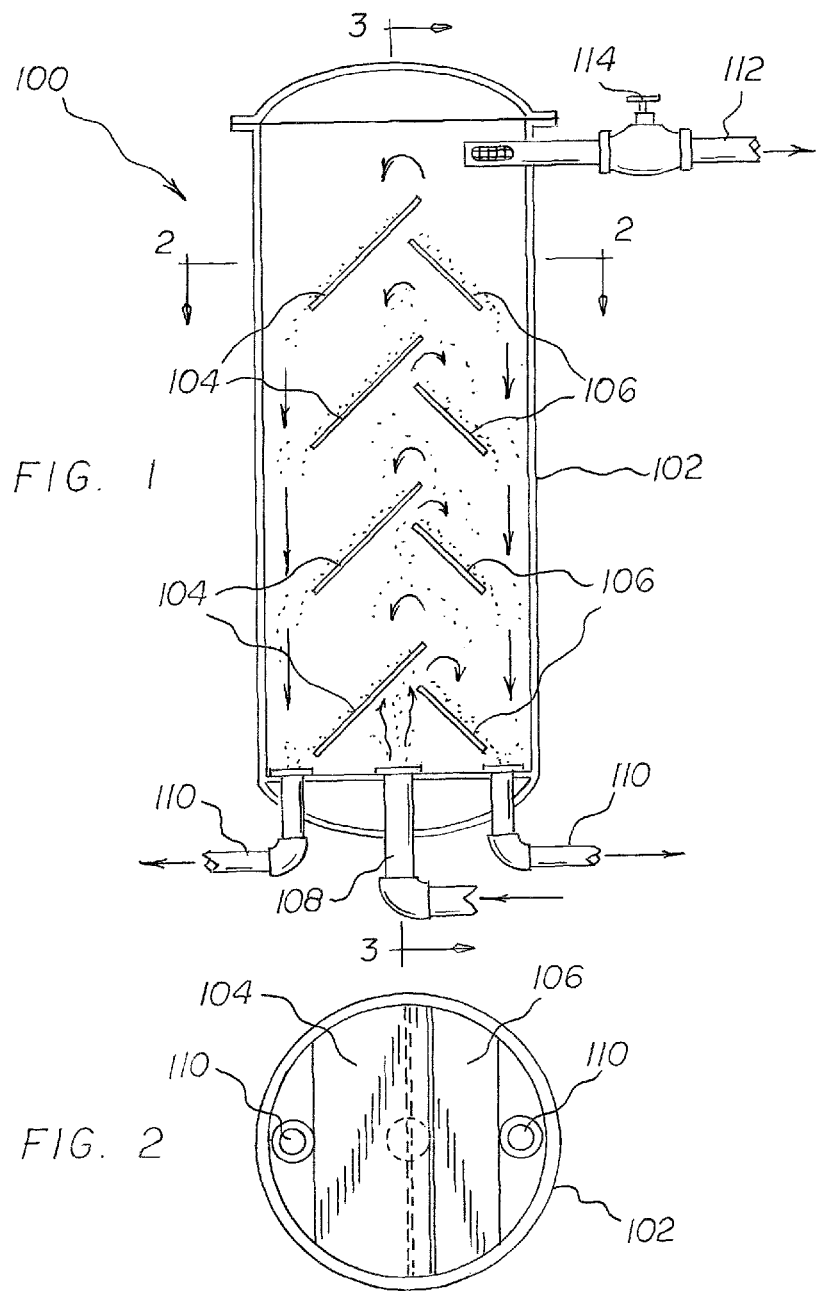

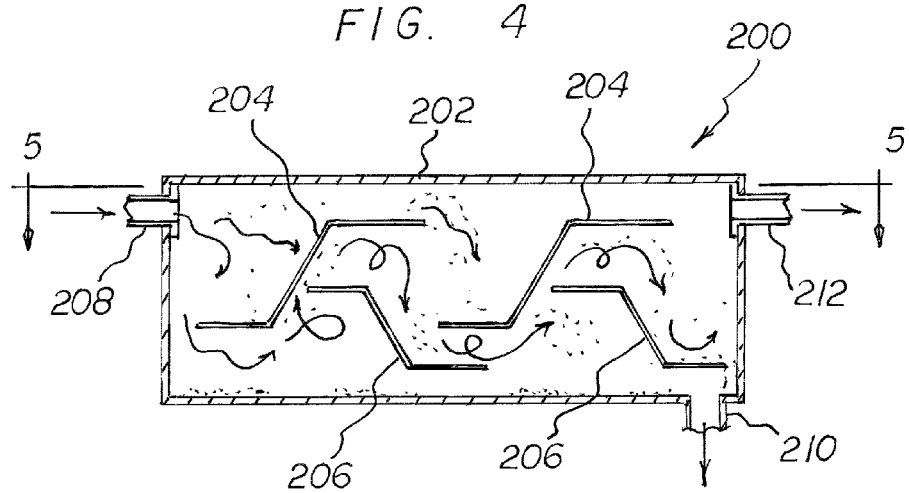
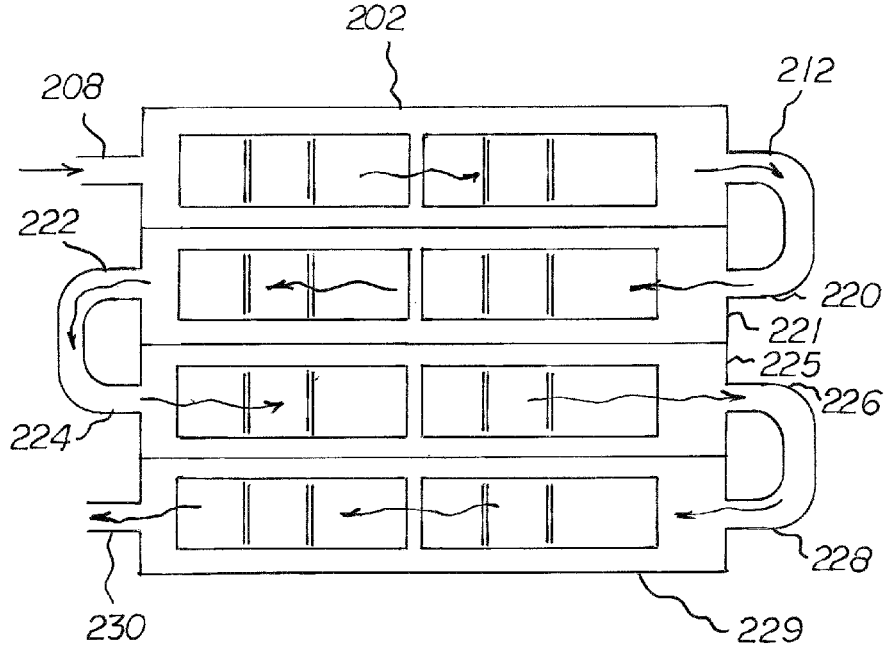

METHOD AND SYSTEM TO SEPARATE SOLIDS FROM LIQUIDS

I. FIELD

The present invention relates in general to a method and system to separate solids from liquids.

II. DESCRIPTION OF RELATED ART

Water clarification is the process of removing suspended solids from water. While a degree of clarification can be accomplished by subsidence (settling), most industrial processes require better quality water than can be obtained from subsidence only.

Settling velocities may be calculated from Stokes' Law.

$$V = \frac{2662(S_1 - S_2)D^2}{z}$$

Where V=Velocity of fall (ft/sec)
D=Diameter of particle (in)
$S_1$=Density of particle (lb/ft3)
$S_2$=Density of fluid (lb/ft3)
z=Viscosity (centipoises)

In this equation it is assumed that the particles are spherical, failing under viscous resistance, and that they have no electrostatic charges.

Most of the suspended matter in water would settle, given enough time, but in most cases the amount of time required would not be practical. The time required for settling is dependent on many factors, including weight of the particle, shape of the particle, size of the particle, and viscosity and/or frictional resistance of the water, which is a function of temperature.

Accordingly, granular media filters have been used to decrease the amount of time to remove suspended solids from water. These filters have also been used for removing suspended solids from pretreated water. The filtered solids are trapped at the surface of the filter bed and in the interstitial spaces within the filter bed. Granular media filters are generally designed and operated with flow in the downward direction.

Granular media filters are cleaned by a periodic washing operation where water is passed upwardly through the filter bed in the opposite direction of the normal operating flow. The rate of water applied for washing depends on the size of the granular media and the desired fluidization. The filters have the ability to be cleaned more completely and more efficiently by agitating the bed with air or other means simultaneously with the upward flow of the backwash water. However, the extreme turbulence caused by the agitation may result in the granular media carried over the discharge edge of the backwash trough and consequently lost from the filter.

Baffles have been used around the backwash trough in an attempt to reduce the turbulence in the vicinity of the overflow weir with the expectation that the granular media that may have been carried upwards with the wash water will settle and not be carried into the wash trough and lost from the filter. For example, a vertical baffle may be placed on each side of the launder trough to define the uniform flow channels. The trough or launder has a rectangular cross-section. Additional baffles are mounted at the lower corners of the trough to extend outwardly and downwardly beneath the lower ends of the vertical baffles to define a restricted inlet to the outflow channels. The liquid flow velocity through the outflow channels is controlled so that it does not exceed the settling velocity of the filter bed material. However, any filter bed material carried up by the wash liquid is generally carried to a region outside of the flow channels defined by the baffles.

Therefore, a need exists in the art for a method and system to more quickly separate solids from liquids without using mechanical means or filters that are ineffective and require significant maintenance or time to operate.

However, in view of the prior art at the time the present invention was made, it was not obvious to those of ordinary skill in the pertinent art how the identified needs could be fulfilled.

III. SUMMARY

In a particular embodiment, a system to separate solids from liquids is disclosed. The system includes at least one tank and a series of alternating baffles disposed along a length of the tank, where the series of alternating baffles define a vertical tortuous flow path of the fluid from a first end of the tank to a second end of the tank to cause solids to settle out of the fluid. The system also includes an inlet to the tank located at the first end of the tank, an outlet to the tank located at the second of the tank, and a solids sump located proximate a bottom portion of the tank, where the sump is configured to collect the solids from the tank. The alternating baffles each have a sloped planar surface disposed between a lower horizontal planar surface and an upper horizontal planar surface to cause at least one eddy in a vertical plane as the fluid flows through the tank. The system may also include a series of tanks in fluid communication with the at least one tank and secured side by side, where the solids progressively settle out from the fluid in stages as the fluid passes from one tank to another in series. The alternating baffles are configured to settle out the solids using a plurality of eddies formed between the alternating baffles and generated by the fluid flowing in a vertical plane.

In another particular embodiment, a series of alternating baffles are disposed along a height of the tank on opposing sides, wherein the series of alternating baffles define a tortuous flow path of the fluid from a bottom portion of the tank to a top portion of the tank to cause solids to settle out of the fluid. The system also includes an inlet to the tank located at a centrally located position at the bottom portion of the tank, an outlet to the tank located at the top portion of the tank, and a solids sump located proximate a periphery of the bottom portion of the tank, where the sump is configured to collect the solids from the tank. The alternating baffles are angled to create a slope outwards to the periphery of the tank.

In another particular embodiment, a method to separate solids from liquids is disclosed. The method includes pumping fluid with suspended solids to at least one tank, and using a series of alternating baffles disposed along a length of the tank to define a vertical tortuous flow path of the fluid from a first end of the tank to a second end of the tank to cause solids to settle out of the fluid. The method also includes configuring the alternating baffles to settle out the solids using a plurality of eddies formed between the alternating baffles and generated by the fluid flowing in the vertical plane. A width of the at least one tank is less than both a length and height of the at least one tank. Further, the method includes configuring a series of tanks side by side and in fluid communication with the at least one tank to progressively settle out the solids from the fluid in stages as the fluid passes from one tank to an adjacent tank in series. The alternating baffles each have a sloped planar surface disposed between a lower horizontal planar surface and an upper horizontal planar surface to generate the plurality of eddies in a vertical plane as the fluid flows through the tank.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 1 is an elevational sectional view of one embodiment of a system to separate solids from liquids, where the flow path is indicated by arrows;

FIG. 2 is a top plan view of the system taken on line 2-2 of FIG. 1;

FIG. 4 is an elevational sectional view of an alternative embodiment of a system to separate solids from liquids, where the flow path is indicated by arrows; and FIG. 5 is a top plan view of the system taken on line 5-5 of FIG. 4.

V. DETAILED DESCRIPTION

Figure 3:
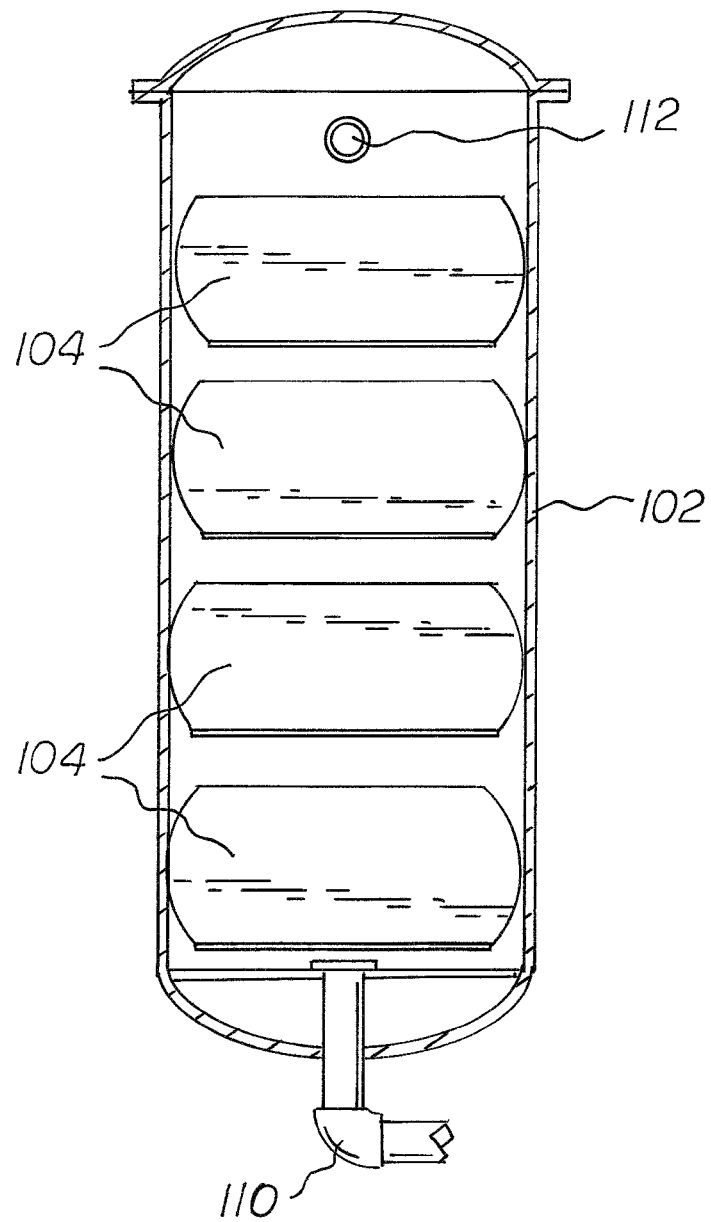
FIG. 3 is a sectional view taken on line 3-3 of FIG. 1, showing the baffles.

The method and system to separate solids from liquids is disclosed and generally designated 100. The system 100 removes suspended solids from the influent. In particular, the settling tank 102 shown in FIG. 1 includes a series of alternating baffles 104, 106 disposed along a height of the tank 102 and on opposing sides of the tank 102. FIG. 1 is an elevational sectional view of one embodiment of a system to separate solids from liquids, where the flow path is indicated by arrows. The series of alternating baffles 104, 106 define a tortuous flow path of the fluid from a bottom portion of the tank 102 to a top portion of the tank 102 to cause solids to settle out of the fluid by creating gentle eddy currents. The eddies that are formed around the baffles 104, 106 generally have lower velocity than the flow velocity through the tank 102. These pockets of lower flow velocity allow the heavier solids to settle out from the fluid without slowing down the overall flow velocity through the tank 102.

An inlet 108 to the tank 102 is at a centrally located position at the bottom portion of the tank 102 and an outlet 112 to the tank 102 located at the top portion of the tank 102. The influent enters the tank 102 through the inlet nozzle 108 that causes a stirring of the fluid contents. This stirring ensures mixing of the liquid and promotes the breakup of larger solid particles. The hydraulic retention time within the tank 102 depends upon the flow rate of the influent. An outlet valve 114 may be used to control the flow rate of the clarified effluent from the top portion of the tank 102.

A solids sump 110 is located proximate a periphery of the bottom portion of the tank 102, where the sump 110 is configured to collect and remove from the tank 102 the solids that settled out of the liquid. The alternating baffles 104, 106 are angled to create a slope outwards to the periphery of the tank 102 and the baffles 104, 106 may be secured to a wall of the tank 102 or supported by other similar means.

FIG. 2 is a top plan view of the system taken on line 2-2 of FIG. 1. The settling solids agglomerate and slide toward the bottom of the tank 102 to the sump 110. FIG. 3 is a sectional view taken on line 3-3 of FIG. 1, showing the baffles.

The method and system produces a clarified effluent that may be reused or disposed of without violating permitted values. The method and system also has applications in the treatment of wastewaters that contain higher concentrations of solids. Pretreatment usually is required and consists of processes that separate the suspended solids from the fluid phase of the wastewater. For example, the pretreatment separation processes may consist of screw presses, belt presses, drum separators, and filter presses. The method and system is compatible with any processes that are capable of separating the solids from the liquid wastewater. After separating the suspended solids from the raw wastewater, the remaining dissolved and colloidal solids are easily removed from the pretreated wastewater using conventional means.

To better control the operation of the system 100, a recycle return pump (not shown) may be used to provide loops between the effluent and the influent lines. This permits the blending of a highly concentrated influent with a portion of treated effluent, thus reducing the concentration of contaminants in the influent waste stream making the liquid more treatable. A physical filter may be used to further separate solids from the effluent before recycling and/or for further processing.

Referring now to FIG. 4, an alternative embodiment of a system to separate solids from liquids in a liquid is disclosed and generally designated 200. FIG. 4 is an elevational sectional view of an alternative embodiment of a system to separate solids from liquids, where the flow path is indicated by arrows. FIG. 5 is a top plan view of the system taken on line 5-5 of FIG. 4. The system 200 includes at least one tank 204 and a series of alternating baffles 204, 206 disposed along a length of the tank 202. The series of alternating baffles 204, 206 define a vertical tortuous flow path of the fluid from a first end of the tank 202 to a second end of the tank 202 to cause solids to settle out of the fluid. An inlet 208 to the tank 202 is located at the first end of the tank 202 and an outlet 212 to the tank 202 is located at the second of the tank 202. A solids sump 210 is located proximate a bottom portion of the tank 202, where the sump 210 is configured to collect the solids that have settled out from the liquid.

The alternating baffles 204, 206 each have a sloped planar surface disposed between a lower horizontal planar surface and an upper horizontal planar surface to cause at least one eddy in a vertical plane as the fluid flows through the tank 202. The alternating baffles 204, 206 may be secured to the walls of the tank 202. A width of the tank 202 may be less than both a length and height of the tank 202.

In addition, the system may include a series of tanks 202, 221, 225, 229 in fluid communication with each other and secured side by side as illustrated in FIG. 5. For example, a first tank 202 may include an outlet 212 in fluid communication with an inlet 220 for a second tank 221 adjacent the first tank 202. Similarly, the outlet 222 from the second tank 221 is in fluid communication with the inlet 224 for the third tank 225, and the outlet 226 from the third tank is in fluid communication with the inlet 228 for the fourth tank 229. Accordingly, the solids progressively settle out from the fluid in stages as the fluid passes from one tank to another in series with the effluent from each tank having less suspended solids than the respective influent. A waste pipe 210 may be used to remove the solids that have settled out from the tanks 202, 221, 225, 229.

The alternating baffles 204, 206 are configured to settle out the solids using a plurality of eddies formed between the alternating baffles 204, 206 and generated by the fluid flowing in a vertical plane. The system has a far shorter retention time than a traditional settlement tank that relies on long retention times. The ability to use a higher loading rates and short hydraulic retention time is due, at least in part, to the configuration of the alternating baffles and eddies created.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features.

What is claimed is:

1. A system to separate solids from liquids in a fluid, the system comprising:
    at least one tank;
    a series of alternating baffles disposed partially across a width of the tank along a height of the tank on opposing sides at opposite angles, wherein the series of alternating baffles define a tortuous flow path of the fluid from a bottom portion of the tank up through a central portion of the tank to a top portion of the tank without contacting front or rear portions of the tank to cause solids to settle out of the fluid along the front or rear portions of the tank;
    an inlet to the tank located at a centrally located position at the bottom portion of the tank;
    an outlet to the tank located at the top portion of the tank; and
    a solids sump located proximate a periphery of the bottom portion of the tank, wherein the sump is configured to collect the solids from the tank.

2. The system of claim 1, wherein the alternating baffles are angled to create a slope outwards to the front and rear portions of the tank.

3. The system of claim 2, wherein the alternating baffles are secured to a wall of the tank.

4. The system of claim 3, further comprising an outlet valve to control a flow rate of a clarified effluent from the top portion of the tank.

5. The system of claim 4, further comprising a waste pipe in fluid communication with the solids sump of the tank.

6. The system of claim 5, further comprising an inlet pipe in fluid communication with the inlet.

* * * * *